No. 609,122. Patented Aug. 16, 1898.
S. S. PRIDHAM.
APPARATUS FOR RECOVERING AMMONIUM SALTS FROM REFUSE.
(Application filed Oct. 7, 1896.)
(No Model.)

WITNESSES:
Wm. H. Campfield, Jr.
Marcy F. Trusdell

INVENTOR:
SAMUEL S. PRIDHAM,
BY
Fred'k E. Gaentzel,
ATTORNEY

UNITED STATES PATENT OFFICE.

SAMUEL SHUGARD PRIDHAM, OF NEWARK, NEW JERSEY.

APPARATUS FOR RECOVERING AMMONIUM SALTS FROM REFUSE.

SPECIFICATION forming part of Letters Patent No. 609,122, dated August 16, 1898.

Application filed October 7, 1896. Serial No. 608,103. (No model.)

*To all whom it may concern:*

Be it known that I, SAMUEL SHUGARD PRIDHAM, a citizen of the United States, residing at Newark, in the county of Essex and State of New Jersey, have invented certain new and useful Improvements in Apparatus for Utilizing Waste Products; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to a novel apparatus for utilizing the valuable substances from waste products, such as animal and fecal matter and slaughter-house refuse or the like; and the object of this invention is to provide a new and economical apparatus for utilizing these waste products to produce a fertilizer, as well as reclaiming the salts of ammonia and other valuable products now lost.

The invention therefore consists in the novel arrangements and combinations of mechanical structures and mechanism to be hereinafter fully set forth, and finally embodied in the clauses of the claim.

The great trouble in handling refuse matter of the nature hereinabove stated is that by reason of the organic animal matter being in a moist state and often in a state of partial decay it contains a large percentage of moisture, and the main purpose of this invention, therefore, is to treat the refuse matter rapidly and expel the moisture therefrom, in that the salts obtained and the fertilizer produced may be in a marketable condition.

The apparatus employed for carrying out the different steps of my process is illustrated in the accompanying drawings, in which—

Figure 1:
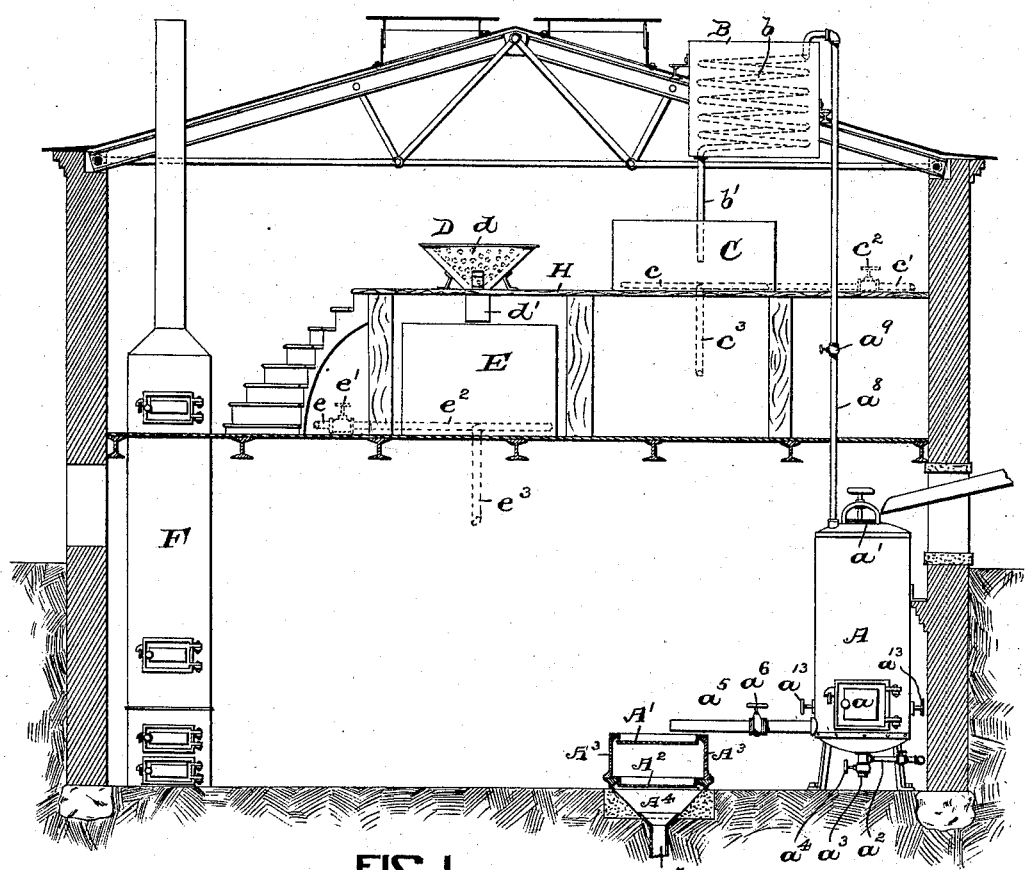
Figure 2:
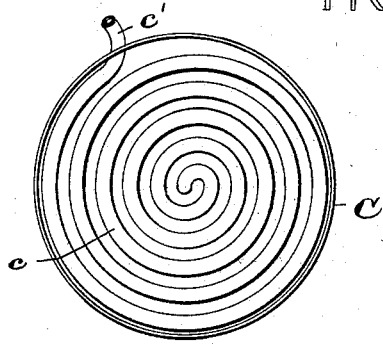
Figure 3:
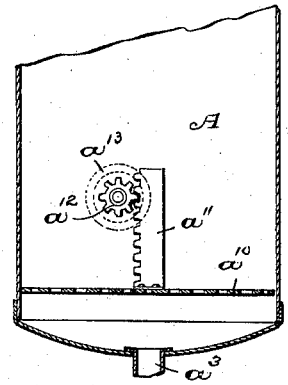

Figure 1 is a vertical section of a building with the plant employed in my process represented in elevation. Fig. 2 is a top view of the condensing-tank or of one of the evaporating-tanks, and Fig. 3 is a vertical section of the lower portion of a tank or cylinder in which the waste products are subjected to the action of steam.

In said drawings, A is a suitable tank provided at or near the bottom with a door $a$ and a cover $a'$ in the top of said tank, by means of which the refuse matter is passed into said tank. Into the bottom of said tank extends a steam-pipe $a^2$ for admitting steam into the tank, and $a^3$ is a suitable outlet-pipe which is provided with a valve $a^4$. At one side of said tank A and in communication with the interior thereof is an outlet-pipe $a^5$, which is provided with a valve or gate $a^6$. Said pipe $a^5$ terminates directly above a suitable screen A', arranged upon the supports $A^3$, substantially as illustrated.

$A^2$ is a second screen, likewise held in position on said supports $A^3$, and $A^4$ is a receptacle having a waste-pipe $a^7$ connected therewith. In communication with the dome or top of said tank A is a pipe $a^8$, in which there is a valve $a^9$, said pipe in turn being connected with a coil or worm $b$ in the condensing-tank B. Said worm passes from the bottom of said tank B and terminates in an evaporating-tank C, placed upon a platform H, and in which I have arranged a spirally-constructed steam-pipe $c$, connected with the inlet-pipe $c'$, in which there is a valve $c^2$, and also with the outlet-pipe $c^3$, substantially as shown. On said platform is a suitable receptacle D, having a strainer $d$, which is preferably funnel-shaped and terminates in an outlet $d'$, directly above a second evaporating-tank E, into which passes a steam-pipe $e$, having a valve $e'$, and forming a spirally-constructed part $e^2$, which finally terminates in an outlet-pipe $e^3$.

F is a suitable roasting-furnace for the purposes to be hereinafter set forth.

The tank A, as will be seen from Fig. 3, is provided in the bottom with a perforated plate $a^{10}$, having a pair of racks $a^{11}$, in engagement with which are the pinions $a^{12}$, operated by the hand-wheels $a^{13}$, as will be clearly evident from Figs. 1 and 3.

When the apparatus is to be used for the purposes above stated, the door $a$ in the tank A is opened, and by turning the wheels $a^{13}$ the plate $a^{10}$ is raised to permit the placing underneath said plate and into the bottom of the tank A of a sufficient quantity of lime, when the plate $a^{10}$ is lowered to thoroughly pack the lime, when the door $a$ is again closed. The cover $a'$ at the top is now opened, valves $a^4$, $a^6$, and $a^9$ in their respective pipes being closed to admit of the waste products, such as animal or fecal matter or slaughter-house refuse, into the tank A. When the tank A is sufficiently filled, then the lid or cover $a'$ is closed down and sealed up.

The steam from the pipe $a^2$ is now admitted into the bottom of the tank A, forcing the lime through the refuse matter, which sets any ammonia contained in the sludge formed in the tank A free in the form of vapor. As soon as the valve in the pipe $a^8$ is opened this vapor passes into the worm or coil $b$, which is arranged in a suitable tank B, as has been stated. The vapors are condensed in said coil $b$, and passing through the pipe $b'$ in the form of a liquor is deposited in the evaporating-tank C. Steam is now passed through the coil $c$ to thoroughly heat the liquor in said tank C, whereby the moisture is sufficiently evaporated and escapes through suitable outlets in the building. After having previously added a sufficient quantity of sulfuric or muriatic acid to the liquor in the tank C as may be desired the black salts of ammonia are precipitated and left in this tank for some time and thoroughly treated to this steaming process. After the salts have been sufficiently steamed to drive off all moisture I dissolve the salts in pure water which is poured into said tank C, and then by means of ladles or in any other manner this liquor is passed through the strainer $d$ into the tank E, where the steam which passes through the coil $e^2$ in said tank E evaporates all moisture, the salts of ammonia being precipitated in the usual manner as pure crystal in the bottom of said tank, from which they can be removed for marketable purposes.

Of course it will be evident that I may use any other number of such tanks, as C and E, to further purify the crystals, should this be necessary.

After I have obtained all the ammonia from the sludge in the tank A, I open the valve $a^6$ in the pipe $a^5$ and collect the remaining solid matter upon the screens A' and A², allowing the dripping to pass off through the waste-pipe $a^7$. When this solid mass has sufficiently dried, it is placed in a suitable roasting-furnace, as F, and turned into powder to produce a fertilizer in a merchantable condition, ready for use, free from offensive odors and other objectionable features, and containing the necessary plant-food, being rich in potash and phosphor-containing ingredients.

Having thus described my invention, what I claim is—

1. The herein-described apparatus for reclaiming salts of ammonia from waste products, as animal or fecal matter or slaughter-house refuse, comprising, a tank A, a condensing-tank B, and connecting-pipe $a^8$, a coil $b$ and a pipe $b'$, a tank C and steam-coil in said tank, a strainer, as $d$, a tank E and a steam-coil in said tank, substantially as and for the purposes set forth.

2. The herein-described apparatus for reclaiming salts of ammonia from waste products, as animal or fecal matter or slaughter-house refuse, comprising, a tank A, a condensing-tank B, and connecting-pipe $a^8$, a coil $b$ and pipe $b'$, a tank C and steam-coil in said tank, a strainer, as $d$, a tank E and a steam-coil in said tank, an outlet-pipe $a^5$ connected with said tank A, and a screen, as A', substantially as and for the purposes set forth.

3. As a means for utilizing the waste products, as animal and fecal matter or slaughter-house refuse, the combination, with a tank A, having an opening $a$, and a perforated plate movably arranged therein, of a condensing-tank B, a connecting-pipe $a^8$, a coil $b$ and a pipe $b'$, a tank C, and steam-coil in said tank, a strainer $d$, a tank E, and a steam-coil in said tank, all substantially as and for the purposes set forth.

4. As a means for utilizing the waste products, as animal and fecal matter or slaughter-house refuse, the combination, with a tank A, having an opening $a$, and a perforated plate, racks connected therewith, pinions meshing with said racks, and means for operating said pinions, of a condensing-tank B, a connecting-pipe $a^8$, a coil $b$ and a pipe $b'$, a tank C and steam-coil in said tank, a strainer $d$, a tank E and a steam-coil in said tank, all substantially as and for the purposes set forth.

In testimony that I claim the invention set forth above I have hereunto set my hand this 5th day of October, 1896.

SAMUEL SHUGARD PRIDHAM.

Witnesses:
FREDK. C. FRAENTZEL,
WM. H. CAMFIELD, Jr.